(No Model.)
P. D. HARTON.
CAKE OR BISCUIT MACHINE.
No. 543,131. Patented July 23, 1895.
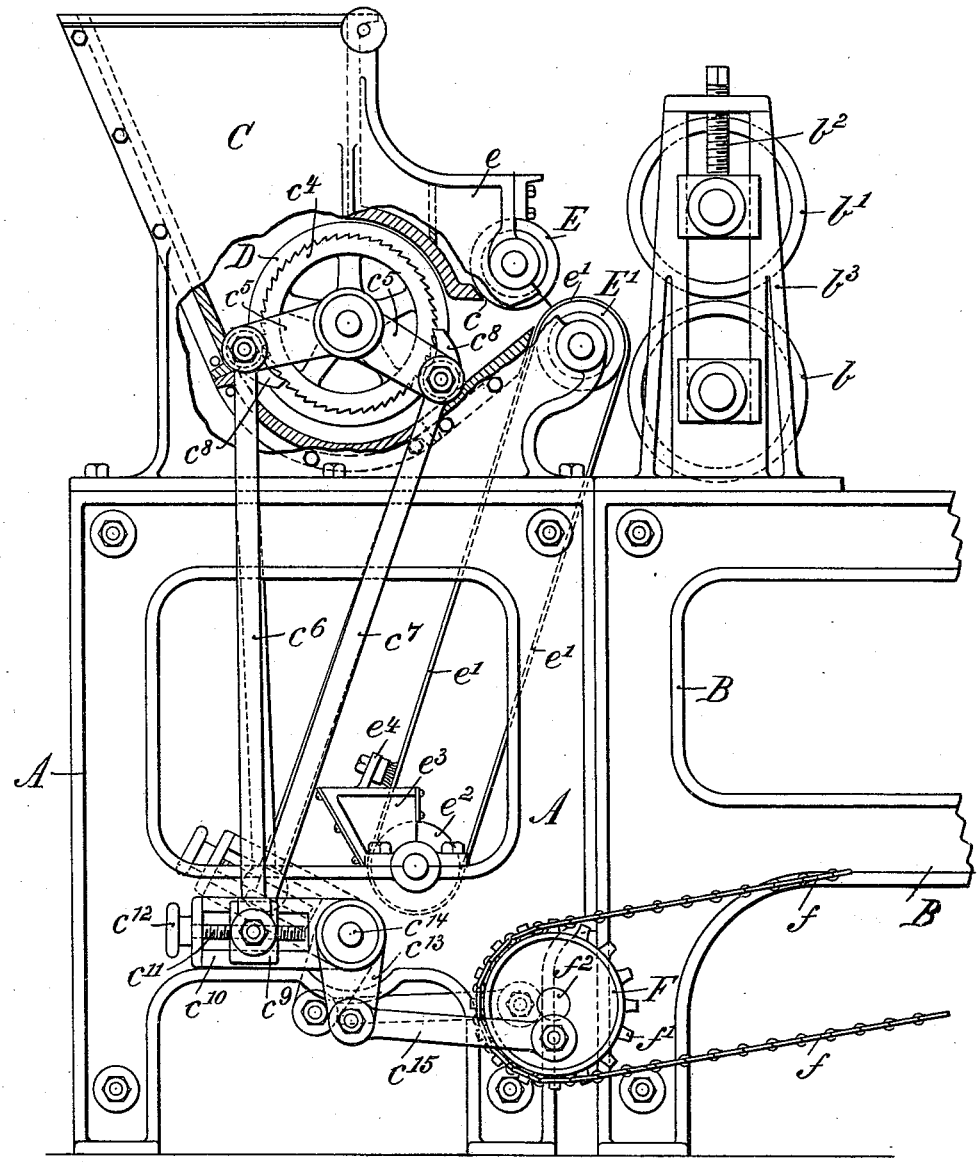
Witnesses:
Thomas M. Smith
Louis Winterberger.
Inventor,
Pembroke D. Harton,
By J. Walter Douglass.
Attorney.

United States Patent Office.

PEMBROKE D. HARTON, OF PHILADELPHIA, PENNSYLVANIA.

[CAKE OR BISCUIT MACHINE.

SPECIFICATION forming part of Letters Patent No. 543,131, dated July 23, 1895.

Application filed July 30, 1894. Serial No. 518,923. (No model.)

*To all whom it may concern:*

Be it known that I, PEMBROKE D. HARTON, a citizen of the United States, residing at the city of Philadelphia, in the county of Philadelphia and State of Pennsylvania, have invented certain new and useful Improvements in Cake or Biscuit Machines, of which the following is a specification.

My invention has relation to cake and biscuit machinery; and in such connection it relates to the provision of such machinery with a force-feed in the hopper thereof and with rolling means journaled to the hopper about the outlet-throat of the same adapted to condense and deliver a dough-like mass in sheet form to permit of its being worked by means of dies or molds into cakes, biscuits, or the like.

The principal objects of my invention are, first, to provide a cake or biscuit machine with a hopper having a force-feed therein and rolling means located about the outlet-throat of the hopper for condensing and delivering the mass transformed thereby into sheets or the like; second, to provide a cake or biscuit machine provided with a hopper having a force-feed and rolls in the outlet-throat thereof, the construction being such that the dough-like mass forced by said feed against the surface of said rolls causes rotation thereof and said dough to be condensed and delivered therefrom in a continuous sheet or the like and by means of dies, molds, or the like to assume required shapes or forms for baking and use; third, to provide such a machine with a feed actuated step by step by mechanism adapted to control the relative rates of speed of the same with respect to the condensing as well as delivering means of the machine to economically produce a uniform and continuous sheet of a dough-like mass caused to assume required forms or shapes, and, fourth, to provide a cake or biscuit machine with a hopper having a controlled feed and rolls journaled to the outlet thereof and actuating mechanism for said feed controlled from the driving-shaft of the machine and arranged so that the speed of the feed may be differentiated by swivel means connected therewith.

My invention consists of the improvements in a cake and biscuit machine constructed, arranged, and adapted for operation in substantially the manner hereinafter described and claimed.

The nature and scope of my invention will be more fully understood from the following description, taken in connection with the accompanying drawing, forming part hereof, illustrating in side elevation a machine embodying the features of my invention.

Referring to the drawing, A represents the standards of the machine of my invention bolted to or abutting against like standards B, of what is known as a "panning or scrapping machine" provided with two rotatable press-rolls $b$ and $b'$, arranged so as to frictionally contact with each other under the influence of a jamming device $b^2$ on each side connected with the vertical supports $b^3$, held on the standards B, and the said devices $b^2$ engaging the end journals of the upper frictional roll $b'$.

C is a feed-hopper supported to position on the standards A and provided internally with a rotatable or other preferred form of a force feeding device D. The hopper C, at the right hand end thereof, is provided with a vertical flour-box $e$ and with a contracted outlet or throat $c$. At or about the end of the outlet-throat $c$ are journaled to the casing of the hopper C two rotatable frictional rolls E and E', the upper one partially engaging the vertical flour-box $e$ and the lower one being surrounded by an endless apron or belt $e'$. This apron or belt $e'$ surrounds, also, a roll $e^2$, which is journaled to the lower portions of the two standards A of the machine, and the roll $e^2$ and apron or belt $e'$ extending into and through a flour-box $e^3$, which is supported to position on the standards A. This box $e^3$ has an adjustable brush or scraper $e^4$, which engages the surface of the apron or belt $e'$, for regulating the quantity of flour or the like lifted by the belt or apron $e'$ from the box $e^3$ in the travel thereof onto one surface of the dough-like mass forced by the feed of the hopper C in its rotation into contact with the peripheral surfaces of the frictional rolls E and E', and thereby rotating the same and said rolls, condensing the mass into a continuous sheet, which mass so condensed by means of said rolls is delivered to the press-rolls $b$ and $b'$ of the panning or scrapping machine and then by means of its accessories, forming no part of my present invention, the sheet thus delivered is transformed into different forms of cakes, biscuit, or the like for baking and subsequent use.

$f$ is a sprocket-chain engaging the sprockets $f'$ of eccentrics F, mounted on both ends of a cross-shaft $f^2$, journaled to the standards A of the machine.

Both of the end journals of the feeding device D of the funnel-shaped hopper C are provided with ratchet-wheels $c^4$, and loosely mounted thereon are angular rocking beams $c^5$, having connecting-rods $c^6$ and $c^7$, attached to the ends of said beams and each provided with a pawl $c^8$ at one extremity of the same, which is adapted to engage with a tooth of the ratchet-wheels $c^4$ to rotate the feeding device D by a step-by-step movement, so as to positively force the dough-like mass from the lower portion of the hopper C through the throat or outlet $c$ thereof into the presence of the two friction-rolls E and E' to rotate the same, and by their rotation the mass is condensed into a continuous sheet or the like. The lower end of the depending connecting-rod $c^6$ is provided with a box $c^9$, and the connecting-rod $c^7$ is in pivotal connection with said box. This box $c^9$ is in sliding engagement with an oblong slotted arm $c^{10}$, provided with a swivel-screw $c^{11}$, with an integral jam-nut $c^{12}$. The swivel-screw connection $c^{11}$ extends through said slotted arm and box $c^9$, and the said arm forms part of a crank-arm $c^{13}$, mounted on a cross-shaft $c^{14}$, which is journaled to the standards A of the machine. $c^{15}$ is a connecting-rod from said crank-arm $c^{13}$ with the eccentric F on each side of the machine. In the movements of the said eccentrics F on both sides of the machine, by means of the sprocket-chains $f$ from any suitable source of power connected with the driving-shaft of the panning and scrapping machine, a positive step-by-step motion is imparted thereby to the feeding device D of the hopper C to cause said dough-like mass to be forced to and between the friction-rolls E and E', so as to become condensed into a sheet or the like and which is delivered therefrom to and through the press-rolls $b$ and $b'$. These rolls further condense said mass to a thinner sheet preparatory to its delivery onto pans.

It may be here remarked that the swivel connection of the sliding box $c^9$ of each of the slotted arms $c^{10}$ is so arranged as that the speed of rotation of the feed D may be increased or decreased through the manipulation of said swivel connection either to the right or to the left of a center point of said slotted arm, as will be understood from the drawing. The actuating mechanism connected with the force-feed on the opposite side of the machine to that shown in full lines in the drawing has been shown partially in dotted lines, and it will be observed therefrom that the eccentrics F are arranged so that the connecting-rods thereof are set at an angle of about ninety degrees thereto—in a word, that quartered eccentric movements of the pawl-and-ratchet mechanism of the force-feed D are obtained to impart a positive step-by-step movement to the said feed D.

It will be manifestly obvious to those skilled in the art to which my invention appertains that modifications may be made as to details without departing from the spirit of my invention.

Having thus described the nature and objects of my invention, what I claim as new, and desire to secure by Letters Patent, is—

1. In a cake or biscuit machine, a hopper provided with a force feed and rolls journaled to said hopper about the outlet throat thereof, the construction being such that a dough-like mass is adapted to be forced by said feed against said rolls to rotate the same and said rolls to thereby cause said mass to be condensed and delivered in sheet form, substantially as and for the purposes described.

2. In a cake or biscuit machine, a hopper provided with a force feed, rolls journaled to the hopper about the outlet throat thereof, said feed adapted to force a dough-like mass into contact with the peripheries of said rolls and the latter to condense the said mass and deliver the same in sheet form, a pawl-and-ratchet mechanism connected with said feed and controlled by eccentrics, substantially as and for the purposes described.

3. In a cake or biscuit machine, a hopper having a rotary force feed therein, rolls journaled about the outlet throat of said hopper, said feed adapted to force a dough-like mass into contact with the peripheral surface of each roll to rotate the same and so that the said mass may be condensed thereby and delivered therefrom in a continuous sheet form, a pawl-and-ratchet mechanism connected with said feed and provided with means in swivel connection with cranks and eccentrics for controlling the movement of the same, substantially as and for the purposes described.

4. In a cake or biscuit machine, a hopper having a force feed, rolls journaled about the outlet throat of said hopper, said feed adapted to force a dough-like mass into contact with said rolls to actuate the same and thereby to condense the mass into a continuous sheet, one of said rolls provided with an endless apron engaging a complemental roll journaled to a box, a brush adapted to contact with said apron, and a pawl-and-ratchet adjustable mechanism to permit of the actuation of said feed and means connected therewith and adapted to permit of an increase or decrease of the speed of said feed, substantially as and for the purposes described.

5. In a cake or biscuit machine, a hopper provided with a rotary force feed, rolls journaled to said hopper about the outlet throat thereof, said feed adapted to force a dough-like mass into contact with said rolls to rotate the same and said rolls condensing the mass into a continuous sheet, an endless belt or apron connected with one of said rolls and with a roll journaled to a box for applying matter to said mass at the point of condensation of the same into a sheet, mechanism connected with said feed and controlled by eccentrics and swivel connections between said mechanism and eccentrics adapted to permit of an increase or decrease of the speed of said feed, substantially as and for the purposes described.

In testimony whereof I have hereunto set my signature in the presence of two subscribing witnesses.

PEMBROKE D. HARTON.

Witnesses:
THOMAS M. SMITH,
LOUIS WINTERBERGER.